(12) United States Patent
Jamadagni et al.

(10) Patent No.: US 9,516,477 B2
(45) Date of Patent: Dec. 6, 2016

(54) METHOD AND SYSTEM FOR DELIVERING MULTIMEDIA CONTENT CACHED IN WIRELESS CELLULAR NETWORK NODES USING MULTIMEDIA BROADCAST MULTICAST SERVICES (MBMS)

(71) Applicant: Samsung Electronics Co., Ltd., Gyeonggi-do (KR)

(72) Inventors: Satish Nanjunda Swamy Jamadagni, Bangalore (IN); Rajavelsamy Rajadurai, Bangalore (IN); Sarvesha Anegundi Ganapathi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 36 days.

(21) Appl. No.: 14/417,019

(22) PCT Filed: Jul. 22, 2013

(86) PCT No.: PCT/KR2013/006527
§ 371 (c)(1),
(2) Date: Jan. 23, 2015

(87) PCT Pub. No.: WO2014/017789
PCT Pub. Date: Jan. 30, 2014

(65) Prior Publication Data
US 2015/0208209 A1    Jul. 23, 2015

(30) Foreign Application Priority Data

Jul. 23, 2012 (IN) .......................... 2993/CHE/2012
Jul. 11, 2013 (IN) .......................... 2993/CHE/2012

(51) Int. Cl.
*H04W 4/06*    (2009.01)
*H04L 29/08*    (2006.01)
*H04L 12/18*    (2006.01)

(52) U.S. Cl.
CPC ............ *H04W 4/06* (2013.01); *H04L 67/2842* (2013.01); *H04L 12/189* (2013.01)

(58) Field of Classification Search
None
See application file for complete search history.

(56) References Cited

U.S. PATENT DOCUMENTS

2010/0125868 A1    5/2010    Foladare et al.
2011/0188439 A1    8/2011    Mao et al.
(Continued)

FOREIGN PATENT DOCUMENTS

WO    WO 2004/100493    11/2004
WO    WO 2011-054912    5/2011
WO    WO 2011-097763    8/2011

OTHER PUBLICATIONS

3rd Generation Partnership Project; Technical Specification Group Services and System Aspects; Multimedia Broadcast/Muiticast Service (MBMS); Architecture and Functional Description (Release 11), 3GPP TS 23.246 V11.1.0, Mar. 8, 2012, 66 pages.
(Continued)

*Primary Examiner* — Brian Roberts
(74) *Attorney, Agent, or Firm* — The Farrell Law Firm, P.C.

(57) ABSTRACT

A method and system for delivering multimedia content to at least one User Equipment (UE), using a Multimedia Broadcast Multicast Services (MBMS) in a wireless cellular network is provided. The method includes initiating a MBMS session for delivering the multimedia content cached at a local cache server of at least one wireless cellular network node, by at least one cached content manager, defining new control interfaces for communicating between the at least one cached content manager and at least one of: a Multi-Cell Multicast Coordination Entity (MCE) and a MBMS Gateway (MBMS GW), sending a notification on a
(Continued)

new control interface to the MCE for establishing the MBMS session, and signaling at least one Radio Access Network (RAN) node to deliver the multimedia content using the established MBMS session by the MCE.

16 Claims, 3 Drawing Sheets

(56) References Cited

U.S. PATENT DOCUMENTS

| | | | |
|---|---|---|---|
| 2012/0026929 A1* | 2/2012 | Wang | H04W 72/005 |
| | | | 370/312 |
| 2012/0099533 A1 | 4/2012 | Kovvali et al. | |
| 2012/0307707 A1 | 12/2012 | Wang | |
| 2013/0084883 A1* | 4/2013 | Mihaly | H04W 4/028 |
| | | | 455/456.1 |
| 2013/0246631 A1* | 9/2013 | Gonzales | H04N 21/6405 |
| | | | 709/227 |
| 2014/0177512 A1* | 6/2014 | Howard | H04L 12/1881 |
| | | | 370/312 |
| 2014/0192701 A1* | 7/2014 | Drevo | H04W 4/06 |
| | | | 370/312 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Acess Network (E-UTRAN); Overall Description; Stage 2 (Release 11), 3GPP TS 36.300 V11.1.0, Mar. 12, 2012, 194 pages.

European Search Report dated Feb. 23, 2016 issued in counterpart application No. 13822610.5-1853, 12 pages.

PCT/ISA/210 Search Report issued on PCT/KR2013/006527 (pp. 4).

PCT/ISA/237 Search Report issued on PCT/KR2013/006527 (pp. 7).

\* cited by examiner

METHOD AND SYSTEM FOR DELIVERING MULTIMEDIA CONTENT CACHED IN WIRELESS CELLULAR NETWORK NODES USING MULTIMEDIA BROADCAST MULTICAST SERVICES (MBMS)

PRIORITY

This application is a National Phase Entry of PCT International Application No. PCT/KR2013/006527, which was filed on Jul. 22, 2013, and claims priority to Indian Patent Application No. 2993/CHE/2012 filed on Jul. 23, 2012 and Jul. 11, 2013, in the Indian Patent Office, the contents of each of which is incorporated herein by reference.

BACKGROUND

1. Field of the Invention

The present invention relates generally to Multimedia Broadcast Multicast Services (MBMS) in a wireless cellular network, and more particularly to MBMS for delivery of multimedia content cached in wireless cellular network nodes.

2. Description of Related Art

The evolving mobile market has seen a considerable rise in buyers opting for high end mobile phones, such as smart phones. Wireless communication technologies such as Long Term Evolution (LTE) offering higher data speeds encourage users to use data-intensive multimedia services more frequently. With User Equipment (UE), such as the smart phone, and a Personal Digital Assistant (PDA), subscribed to round-the-clock access to internet services and supported by communication technologies, such as LTE, that offer high speed data rates, mobile video, mobile television, and radio broadcasting are expected to grow rapidly.

Multimedia Broadcast Multicast Services (MBMS) in the LTE network enable network operators to stream multimedia content to the UE. The MBMS architecture enables broadcasting and multicasting of the multimedia content. The broadcast services can be received by any subscriber located in the area in which the service is offered. The multicast services can only be received by users who have subscribed to the specific service and who have joined the multicast group associated with the service. Both broadcast and multicast services are unidirectional, point-to-multi-point transmissions of multimedia content and can be applied to broadcast text, audio, picture, and video from a Broadcast Multicast Service Center (BMSC) to any user located in the service area.

Existing methods providing multimedia content are based on MBMS architecture specified by the 3rd Generation Partnership Project (3GPP). The existing MBMS architecture is based on the assumption that the multimedia content for MBMS is always located in a content provider residing outside of the core network (for example, servers in the Internet Protocol (IP) network). With existing methods, whenever the multimedia content located in the content provider, or any other broadcast/multicast source, is to be delivered (broadcasted or multicasted) to the UEs, the BMSC, which is external to the wireless cellular network, serves as an entry point. The BMSC is a functional entity providing the MBMS service to the end-user.

The BMSC schedules the MBMS session, performs MBMS session announcement and signals the Multi-Cell Multicast Coordination Entity (MCE), through the E-UTRAN internal control (M3) interface, to co-ordinate the MBMS session. The MBMS session is established by setting up a user plane (M1) interface and control plane (M2) interface by the MCE. The MCE is a logical entity, responsible for allocation of time and frequency resources for multi-cell MBMS transmission. The MCE performs the scheduling on the radio interface. The M1 interface is a data path established between a MBMS Gateway (MBMS GW) and the relevant Radio Access Network (RAN) nodes to which the multimedia content is to be forwarded for delivery to the UEs. The M2 interface is established between the MCE and the RAN nodes to exchange control signals for the MBMS session. The M3 interface supports the MBMS session control signaling, such as signaling for session initiation and termination.

Thus, the multimedia content to be delivered to the UEs on the MBMS channels has to pass through the BMSC (i.e., BMSC server). Then, the MBMS GW performs MBMS session management and delivers multimedia content received from the BMSC to the relevant RAN nodes by IP multicast over the established M1 interface.

To optimize delivery of multimedia content to the users, network operators are widely deploying Content Distribution Networks (CDNs). The CDNs can handle backhaul overload issues for the network operators. With wide deployment of CDNs overlaid on top of LTE networks, most of the multimedia content is expected to be cached locally at one or more wireless cellular network nodes, such as RAN nodes, Serving Gateways (SGWs), and/or Packet Data Network gateways (PDNs) within the wireless cellular network. However, the existing methods fail to provide a signaling mechanism that enables the wireless cellular network nodes to notify the MCE about locally available cached content that can be used for MBMS. Also, the existing MBMS procedures rely heavily on core network mechanisms to start and stop MBMS sessions.

SUMMARY

The present invention has been made to address the above-mentioned problems and disadvantages, and to provide at least the advantages described below. Accordingly, an aspect of the present invention is to provide a method and system for delivering multimedia content cached at a local cache server of a wireless cellular network node to one or more User Equipments (UEs) by initiating a Multimedia Broadcast Multicast Services (MBMS) session using a cached content manger associated with the wireless cellular network node.

In accordance with an aspect of the present invention, a method for delivering multimedia content to at least one User Equipment (UE) using Multimedia Broadcast Multicast Services (MBMS) in a wireless cellular network is provided. The method includes initiating a MBMS session for delivering the multimedia content cached at a local cache server of at least one wireless cellular network node, by at least one cached content manager, defining new control interfaces for communicating between the at least one cached content manager and at least one of: a Multi-Cell Multicast Coordination Entity (MCE) and a MBMS Gateway (MBMS GW), sending a notification on a new control interface to the MCE for establishing the MBMS session, and signaling at least one Radio Access Network (RAN) node to deliver the multimedia content using the established MBMS session by the MCE.

In accordance with another aspect of the present invention, a system for delivering multimedia content to at least one User Equipment (UE) using Multimedia Broadcast Multicast Services (MBMS) is provided. The system includes at least one Radio Access Network (RAN) node, at least one cached content manager, at least one Serving Gateway (SGW), at least one Packet data network Gateway (PGW), a Broadcast Multicast Service Center (BMSC), a MBMS gateway (MBMS GW), a Mobile Management Entity (MME), a Multi-Cell Multicast Coordination Entity (MCE), and at least one content provider. The system is configured to perform at least one of: initiating a MBMS session for delivering the multimedia content cached at a local cache server of at least one wireless cellular network node, by the at least one cached content manager, defining new control interfaces for communicating between the at least one cached content manager and at least one of the Multi-Cell MCE and the MBMS GW, sending a notification on a new control interface to the MCE for establishing the MBMS session, and signaling the at least one RAN node to deliver the multimedia content using the established MBMS session by the MCE.

In accordance with another aspect of the present invention, a wireless cellular network for delivering multimedia content to at least one User Equipment (UE) using Multimedia Broadcast Multicast Services (MBMS) is provided. The wireless cellular network includes at least one Radio Access Network (RAN) node, at least one cached content manager, at least one Serving Gateway (SGW), at least one Packet Data network Gateway (PGW), a Broadcast Multicast Service Center (BMSC), a MBMS gateway (MBMS GW), a Mobile Management Entity (MME) and a Multi-Cell Multicast Coordination Entity (MCE). The wireless cellular network is configured to initiate a MBMS session for delivering the multimedia content cached at a local cache server of at least one wireless cellular network node, by the at least one cached content manager, define new control interfaces for communicating between the at least one cached content manager and at least one of: the MCE and the MBMS GW, send a notification on a new control interface to the MCE for establishing the MBMS session, and signal at least one RAN node to deliver the multimedia content using the established MBMS session by the MCE.

In accordance with another aspect of the present invention, a User Equipment (UE) subscribed for Multimedia Broadcast Multicast Services (MBMS) in a wireless cellular network is provided. The UE includes at least one processor, and at least one memory having recorded thereon a computer program, where the computer program with the at least one processor is configured to control the UE to cache multimedia content to a Radio Access Network (RAN) node in the wireless cellular network for a MBMS session.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

The embodiments of the present invention provided herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments of the present invention achieve a method and system for delivery of multimedia content cached locally at wireless cellular network nodes by initiating the Multimedia Broadcast Multicast Services (MBMS) session using a cached content manager associated with each wireless cellular network node.

The wireless cellular network node can be a Radio Access Network (RAN) node, a Serving Gateway (SGW), a Packet Data Network gateway (PGW), and the like.

On establishment of the MBMS session, the RAN nodes in the wireless cellular network deliver the locally cached multimedia contents to one or more User Equipments (UEs) which have subscribed for MBMS by a broadcast, a multicast, or a unicast mode of transmission. The RAN nodes decide the mode of transmission based on subscription of the UEs for specific MBMS services and/or the counting mechanism that enables the RAN node to be aware of the number of UEs expecting to receive the multimedia contents through MBMS services. The RAN nodes can switch between multicast and unicast transmission mode as and when necessary. The method defines new control interfaces between the cached content manager, the Multicast Coordination Entity (MCE), and the MBMS Gateway (MBMS GW) for establishing the MBMS session to deliver the multimedia content cached at the local cache server (local cache) of the wireless cellular network nodes.

The new control interface and the cached content manager provides new logical entry points to plug-in the multimedia content cached locally at the wireless cellular network node and then deliver the plugged-in multimedia content to the UEs. The method enables delivery of locally cached multimedia content without the need for a signaling message from the Broadcast Multicast Service Center (BMSC), or the BMSC server, to initiate the MBMS session, unlike the existing methods.

The wireless cellular network nodes can self-initiate the MBMS session for delivery of multimedia content cached locally at these wireless cellular network nodes.

In an embodiment of the present invention, the UE self-initiates a MBMS session for multimedia content delivery to other UEs in the LTE network.

In an embodiment of the present invention, the UE initiates the MBMS session requesting broadcasting and/or multicasting of multimedia content cached locally at the RAN node.

In an embodiment of the present invention, the UE initiates the MBMS session requesting to broadcast and/or multicast the multimedia content cached in the UE.

In an embodiment of the present invention, to minimize existing signaling procedures for MBMS sessions, the BMSC initiates the MBMS session after receiving a notification from the MCE for multimedia content delivery of locally cached content.

In an embodiment of the present invention, the BMSC caches the multimedia content in one or more wireless cellular network nodes for broadcasting at later scheduled time.

The method disclosed provides service handover across the cells of a wireless cellular network enabling the UEs to move freely across the cells and continue receiving MBMS services.

In an embodiment of the present invention, there is provided a mechanism for Packet Data Network (PDN) connection terminating at the RAN node for multimedia content cached locally.

The multimedia content delivered between the RAN node and the UEs is secured over the air interface. In an embodiment of the present invention, the method creates a multicast UE group. In an embodiment of the present invention, the security keys are shared in a local broadcast scenario. The BMSC distributes the MBMS Traffic Key (MTK) to the local cache server to protect the multimedia content before transmitting. The BMSC either distributes the encrypted MTK to the UEs by itself or provides the encrypted MTK to the local cache server to be distributed along with the multimedia content. The BMSC stores the key and the related Identifiers (IDs) (i.e. the MTK Identifier (MTK ID) and the Master Session Key Identifier (MSK ID)) for its reference to retrieve and distribute when requested by the UEs.

The method disclosed efficiently utilizes the multimedia content cached at the wireless cellular network nodes thereby reducing backhaul overload issues, signaling congestion and network resource consumption by avoiding unnecessary holding of network resources.

Typical MBMS user behavior has been shown to access either local content (local news, maps, etc.) or popular events. In either case it is possible to predict a user's access behavior of MBMS multimedia content and cache such content locally at the wireless cellular network nodes.

In an embodiment of the present invention, the UE can be a smart phone, a smart camera, a Personal Digital Assistant (PDA), a laptop, a notepad, and the like.

In an embodiment of the present invention, the wireless cellular network can be a Long Term Evolution (LTE) network, Universal Mobile Telecommunications System (UMTS).

Throughout the description the terms wireless cellular network and LTE network are used interchangeably.

Throughout the description the terms wireless cellular network node and LTE network node are used interchangeably.

Throughout the description the terms RAN node and evolved NodeB (eNB) are used interchangeably.

Referring now to the drawings, and more particularly to FIGS. 1 through 4, where similar reference characters denote corresponding features consistently throughout the figures, there are shown preferred embodiments of the present invention.

Figure 1:
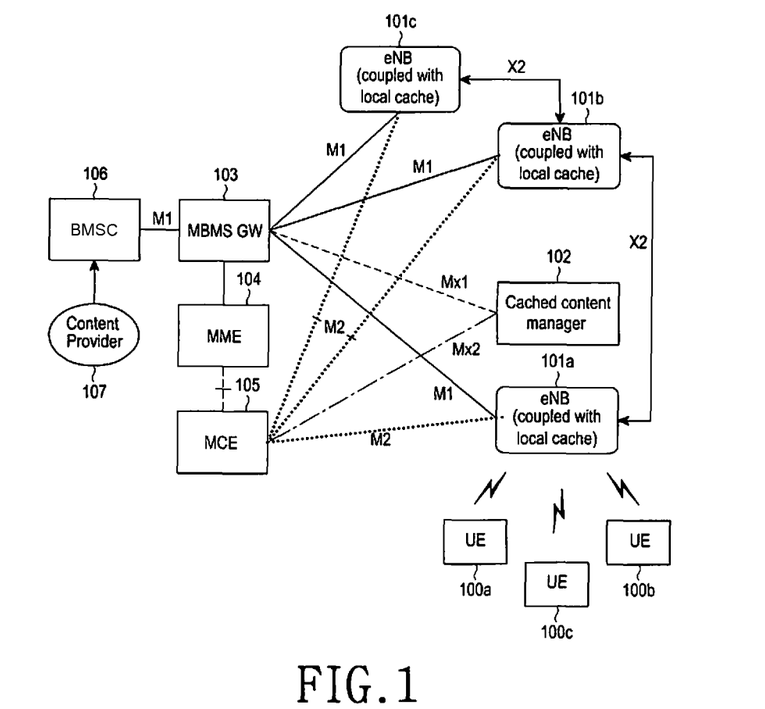
FIG. 1 illustrates a Multimedia Broadcast Multicast Services (MBMS) architecture in a wireless cellular network for delivery of multimedia content cached at the local cache server of a Radio Access Node (RAN) node, according to an embodiment of the present invention.

FIG. 1 illustrates a Multimedia Broadcast Multicast Services (MBMS) architecture in a wireless cellular network for delivery of multimedia content cached at the local cache server of a Radio Access Node (RAN) node, according to an embodiment of the present invention.

Referring to FIG. 1, the figure depicts a UE 100a, a UE 100b, a UE 100c, an eNB 101a, an eNB 101b, an eNB 101c, a cached content manager 102, a MBMS GW 103, a Mobility Management Entity (MME) 104, a MCE 105, a BMSC 106, and a content provider 107.

The UE 100a, UE 100b, and UE 100c are within the service area of the eNB 101a. The eNB 101a is coupled with a local cache. The cached content manger 102 is associated with the eNB 101a. The LTE network comprises a plurality of eNBs, such as eNB 101b and eNB 101c, each coupled with the local cache and the cache content manager 102. For simplicity and better understanding, the interfaces between the eNBs and the entities of the LTE network are depicted only for eNB 101a. The eNB 101a communicates with eNBs 101b and eNB 101c over the existing X2 interface. Whenever the multimedia content from the content provider 107 arrives at BMSC 106 to be delivered to the UE 100a, UE 100b and UE 100c within the service area of eNB 101a, the BMSC 106 notifies the MBMS GW 103. Thereafter, the MBMS GW 103 invokes the MME 104 for MBMS signaling. Further the MME 104 sends control signals to the MCE 105 over the existing M3 interface. On receiving the notification for the MBMS session over the M3 interface, the MCE 105 establishes the user plane (UP) (M1 interface or data path) along the BMSC 106, the MBMS GW 103, and the eNB 101a. The eNB 101a then broadcasts the multimedia content received from the content provider 107 to the UE 100a, UE 100b and UE 100c.

The local cache coupled to the eNB 101a can have cached multimedia content to be delivered to the UE 100a, UE 100b and UE 100c. The cached content manager 102, associated with the eNB 101a, exchanges control signals over the new Mx2 and new Mx1 interfaces to facilitate delivery (broadcasting, multicasting and/or unicasting) of the multimedia content in the local cache of the eNB 101a. In an embodiment of the present invention, the new control signaling interface Mx2 is an enhanced MBMS M2 standard interface and the Mx1 data interface is an enhanced MBMS M1 standard interface. Whenever the eNB 101a has multimedia content for delivering to the UE 100a, UE 100b and UE 100c, the cached content manager 102 notifies the MCE 105 over the new Mx2 interface. The control signals between the cached content manager 102 and the MBMS GW 103, over the new Mx1 interface, enable the MBMS GW 103 to identify that the local cache has multimedia content to be delivered to the UE 100a, UE 100b and UE 100c.

The method disclosed eliminates establishment of the user plane (M1 interface) between MBMS GW 103 and eNB 101a whenever locally cached content at the eNB 101a is to be delivered by establishing the MBMS session. Thus, the method disclosed reduces LTE network signaling and avoids unnecessary holding of LTE network resources. The method disclosed eliminates BMSC 106 initiated signaling for MBMS sessions.

On receiving notification for multimedia content delivery from local cache of eNB 101a on the Mx2 interface, the MCE 105 signals the eNB 101a, over the M2 interface, to broadcast or multicast the multimedia content cached locally.

In an embodiment of the present invention, the UE 100a, UE 100b, and UE 100c receive notification with an advertisement for a specific service. If the UE 100a, UE 100b, and UE 100c subscribe to the service along with other UEs within the service area of the eNB 101a, the UEs together form the multicast group. Further the eNB 101a multicasts the locally cached multimedia content to the identified UEs, including UE 100a, UE 100b, and UE 100c. If any of the UE 100a, UE 100b, and UE 100c move out of the service area of eNB 101a, that UE continues receiving the service through a service handover mechanism across cells. The method disclosed utilizes a counting mechanism to decide whether to broadcast, multicast or unicast the multimedia content in the new cell to which the UE 100a, UE 100b, and/or UE 100c has moved. The counting mechanism that is utilized to decide on the mode of transmission (broadcast, multicast, or unicast) enables the eNBs to reduce inter-signal interference caused by a broadcasting mode of transmission. The eNB selecting a unicasting mode of transmission, rather than broadcasting, whenever very few (based on a predefined threshold) UEs in any cell are subscribed to the MBMS, reduces the interference to other UEs not interested or subscribed to the currently offered MBMS service.

In an embodiment of the present invention, to minimize changes in an existing MBMS signaling procedure, the delivery of locally cached content at eNB 101a is initiated by the BMSC 106 and not by the LTE network node having locally cached multimedia content to be delivered. Thus, when the BMSC 106 is signaled by the MCE 105, the MME 104 ensures that the user plane is established based on which LTE network node initiates the request for the MBMS session. For example, if the eNB 101a has the local cache server, then the MME 104 instructs the eNB 101a to broadcast the content locally without setting up the data bearer path, i.e., without setting up the M1 interface between the MBMS GW 103 and the eNB 101a. If the multimedia content delivery is initiated by the content provider 107, then the M1 interface between the MBMS GW 103 and the eNB 101a is established.

In an embodiment of the present invention, the BMSC 106 can query the LTE network nodes for caching capability. If one or many LTE network nodes signal back with the capability, then the BMSC 106 can store the content in one or more of the LTE network nodes for a later broadcast along with the MTK to protect the multimedia content during transmission. For example, the BMSC 106 can cache the multimedia content scheduled for broadcast on the next day on the previous night when the backhaul load is low (low traffic hours). The BMSC 106 subsequently instructs the cached content manager 102 for later scheduled broadcast. The BMSC 106 stores the key and the related IDs (MTK ID and MSK ID) for its reference to retrieve and distribute when requested by the UEs.

In an embodiment, the broadcast content for a particular location can be cached in the respective RAN nodes, rather than fetching it from a remote location through the core network. For example, in a shopping mall, if continuous broadcast of content is required (like advertisement, discount announcements, or trailers of movies shown on the mall screens) then the content can be broadcasted from the RAN node serving the mall area, rather than content pushed to the core network and then broadcasted from core network. In an embodiment, whenever the locally cached multimedia content to be broadcasted is stored (available) in the eNB 101a and if the broadcast recipients (i.e., the UEs) are spread across multiple cells, the eNB 101a can first store the multimedia content in other eNBs (for example, in eNB 101b and eNB 101c) before sending the MBMS session start message to the MCE 105. In this case, the eNB 101a also notifies the MCE 105 that other eNBs (for example, eNB 101b and eNB 101c) need reception of the multimedia content. The host eNB 101a can send the multimedia content to the other eNBs or stream the multimedia content via the X2 interface just before the MBMS session starts or after the MBMS session starts.

Figure 2:
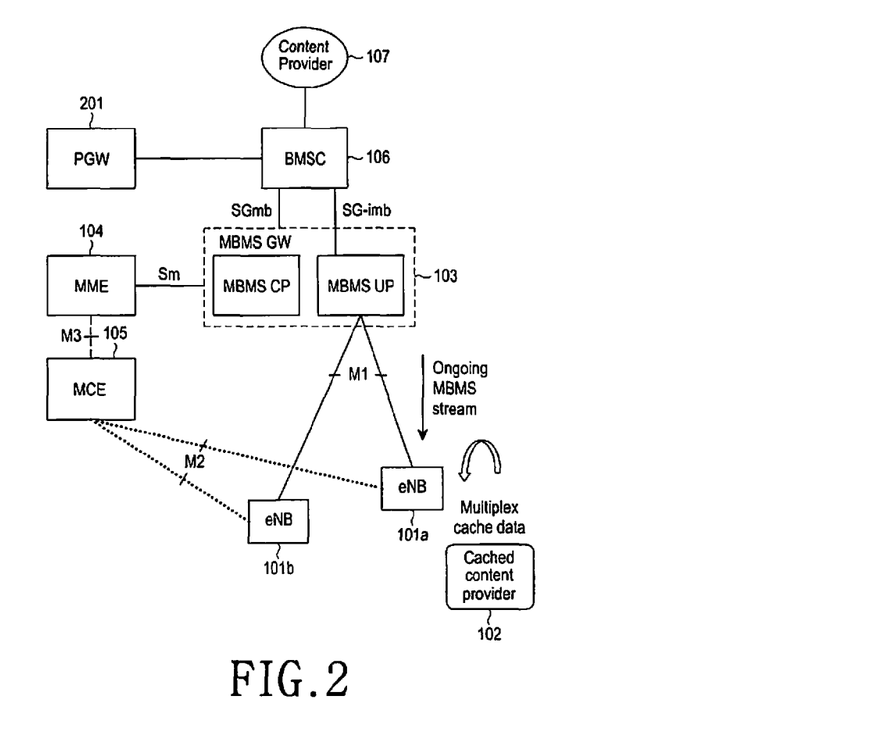
FIG. 2 illustrates a multiplexing of cached multimedia contents which are streamed during an ongoing MBMS session, according to an embodiment of the present invention.

FIG. 2 illustrates multiplexing of cached multimedia contents which are streamed during an ongoing MBMS session, according to an embodiment of the present invention.

Referring to FIG. 2, the figure depicts the eNB 101a, eNB 101b, the MBMS GW 103, the MME 104, the MCE 105, the BMSC 106, the content provider 107 and the PGW 201. The figure depicts an ongoing MBMS session with the multimedia content sourced from the content provider 107 (from behind the BMSC 106 and external to the LTE network). The multimedia content is being streamed through the BMSC 106 to the UEs within the service area of eNB 101a and eNB 101b on the established M1 interface. The M1 interface is between the MBMS UP of the MBMS GW 103 and eNB 101a and eNB 101b. The cached content manager 102 is associated with the eNB 101a. The existing 3rd Generation Partnership Project (3GPP) specified control plane interfaces M2, M3, Sm, SGmb and SG-imb are already established for the ongoing MBMS session. The Sm interface is the reference point for the control plane between MME 104 and MBMS GW 103. The SGi-mb interface is the reference point between BMSC 106 and the MBMS UP function of the MBMS GW 103 for MBMS multimedia content delivery. The SGmb interface is the reference point for the control plane between BMSC 106 and MBMS GW 103. The PGW 201 interfaces with the BMSC 106 and content provider 107 outside the operator's network.

The eNB 101a multiplexes the multimedia content from the local cache coupled to the eNB 101a. In an embodiment of the present invention, the multiplexing can be achieved by an entity resident at the eNB 101a or at the local cache server coupled to eNB 101a. The multiplexed multimedia content can be local to the eNB 101a. The eNB 101b can also be multiplexed with multimedia content at the local cache of eNB 101b.

In an embodiment of the present invention, during an ongoing MBMS session the eNB 101a performs Deep Packet Inspection (DPI) to identify gaps between the multimedia contents (data) being streamed. The cached content manager 102 associated with eNB 101a pushes content in the local cache into the gaps in the data stream. For example, a user may have subscribed for live updates of a cricket match. Most often such updates are discontinuous with gaps between the update information. The cached content manager 102 pushes (multiplexes) local advertisements cached at local cache between the gaps in the data (multimedia content) stream.

Figure 3:
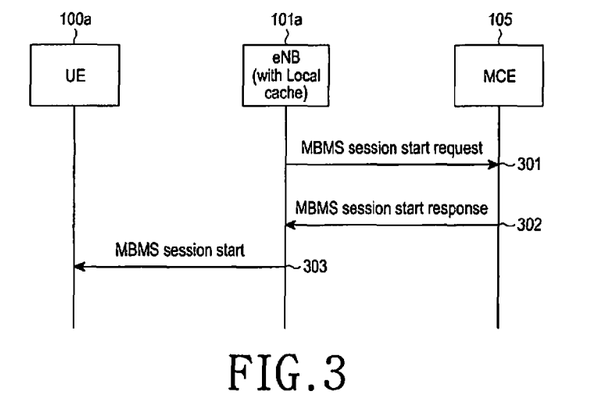
FIG. 3 is a sequence diagram illustrating signaling for a RAN node initiated MBMS session, according to an embodiment of the present invention.

FIG. 3 is a sequence diagram illustrating signaling for the RAN node initiated MBMS session, according to an embodiment of the present invention.

Referring to FIG. 3, the figure depicts UE 100a, eNB 101a, and MCE 105. The eNB 101a has cached multimedia content in the local cache. The eNB 101a has to broadcast or multicast the locally cached multimedia content to a UE multicast group for the specific MBMS session.

In an embodiment of the present invention, the local cache and the cached content manager 102 are tightly coupled to the eNB 101a or reside in the eNB 101a. The UE 100a is a member of the UE multicast group. The cached content manager 102 within the eNB 101a self-initiates the MBMS session and, in step 301, sends a request to the MCE 105 with a MBMS session start message. In step 302, the MCE 105 responds to the MBMS session start message notifying the eNB 101a to start broadcasting or multicasting. Thereafter, in step 303, the eNB 101a sends the MBMS session start message informing the UE 100a about the establishment of a MBMS session. On receiving the message the UE 100a prepares itself to receive broadcasted or multicasted multimedia content through the established MBMS session.

For example, the user could have uploaded the multimedia content for a MBMS session into the local cache, coupled with the eNB 101a, or could simply identify the multimedia content which is available at the local cache of the eNB 101a (or any other LTE network node).

In an embodiment of the present invention, the user is authorized to upload or refer to specific cached multimedia content for multicast or broadcast. In an embodiment of the present invention, the user would be provided with special access rights to upload content to the local cache at eNB 101a, where the eNB 101a could also be a home cell or a Femto cell. When the UE 100a initiates a call with the eNB 101a for specific purpose of caching the multimedia content at the eNB 101a, an notification specifying the purpose of the call can be sent to the eNB 101a. For example, the Random Access Channel (RACH) message could provide an indication that the call type is a local eNB caching call. When such a call is initiated by UE 100a, the call content is cached in the local cache server. In an embodiment of the present invention, the UE initiates a PDN connection using a special Access Point Name (APN), which terminates the PDN connection in the local cache server to upload the multimedia content. Even if the multimedia content is uploaded by the user, the multimedia content transmission is controlled by the MBMS service.

In an embodiment of the present invention, when the cached multimedia content is on a separate server co-located with any other LTE network node (i.e., not closely coupled with an LTE network node), an interface connects the local cache of any other LTE node to the eNB 101a.

In an embodiment of the present invention, if an overlay content-centric network is assumed over the LTE network, then the eNB 101a could still communicate with the multimedia content source node for achieving MBMS broadcast of the locally cached multimedia content. A content-centric router can be assumed to perform the function of distributing the cached content across eNBs in the LTE network. In this case the eNB 101a can simply signal the other eNBs (e.g., eNB 101b and eNB 101b) about the multimedia content to be broadcasted via the existing X2 interface between the eNBs.

In an embodiment of the present invention, the duration of each MBMS service may be different, hence a Service Multiplex is managed dynamically, i.e., the addition or removal of services into/from the MBMS Service Multiplex. The MCE allocates the optimal amount of resources to multiplexed services, using service related information. In a related embodiment, the entity that initiates the MBMS session, i.e. the UE or the eNB, SGW, PGW or the BMSC, will provide the MCE information about the duration of the service. In an embodiment of the present invention, the duration of service information can be provided in the session start message.

Figure 4:
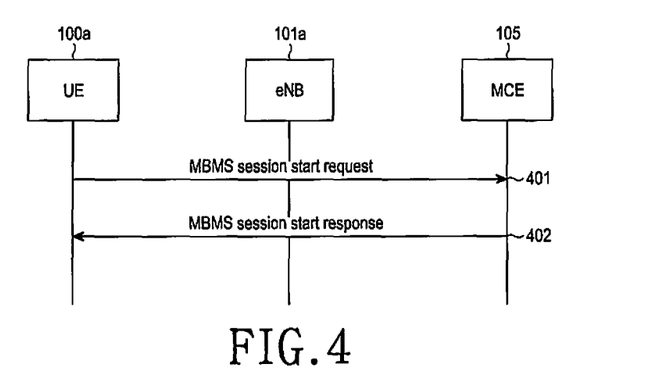
FIG. 4 is a sequence diagram illustrating signaling for a User Equipment (UE) initiated MBMS session, according to an embodiment of the present invention.

FIG. 4 is a sequence diagram illustrating signaling for a UE initiated MBMS session, according to an embodiment of the present invention.

Referring to FIG. 4, the figure depicts UE 100a, eNB 101a, and MCE 105. The user of UE 100a caches multimedia content on the UE 100a.

The UE 100a bypasses the eNB 101a and, in step 401, directly signals the MCE 105, with a request for a MBMS session start message. In step 402, the MCE 105 responds with the MBMS session start message. On receiving the response for MBMS session start, the UE 101a can request the eNB 101a to broadcast and/or multicast the multimedia content available with the UE 100a.

For example, a reporter (i.e., the user) has a camcorder (i.e., UE 100a) with a modem. The reporter is interested in sharing a live recording with a group of friends having their UEs subscribed for MBMS services. Thus, all the UEs, along with UE 100a, form the multicast group. Thus, the recording on the camcorder can then be broadcast by the eNB 101a. If the UE group members are spread across different cells, their respective eNBs are informed and the MBMS services are continued.

In an embodiment of the present invention, a service announcement message is used by the content provider 107 to advertise available MBMS user services to the UE 100a and to provide service related parameters (for example, a session start time) in advance using the Session Description Protocol (SDP). The MBMS User Service Description (MBMS USD) enables service selection for the user. The MBMS USD informs lower layers of the UE 100a that the user is interested in a specific MBMS service. The MBMS USD is rather static and expected to be updated possibly once per day or even less often.

In an embodiment of the present invention, the MBMS USD provides an additional "broadcast area" parameter to include location information which can be defined using various options. One possible implementation of the MBMS USD for Service Announcement is the use of an Electronic Service Guide (ESG). In an embodiment of the present invention, the LTE network node that caches the multimedia content can be the originator of the Service announcement message. In another embodiment of the present invention, the UE 100a that intends to initiate a multicast session can also be the originator of the service announcement message.

In an embodiment of the present invention, the originator of the service announcement message could also provide the location information related to where the service could be available. For example, the eNB 101a could provide the location information in the MBMS USD.

In an embodiment of the present invention, a cell identifier list can be used as location information.

The embodiments of the present invention disclosed herein can be implemented through at least one software program running on at least one hardware device and performing network management functions to control the elements. The elements shown in FIGS. 1, 2 3 and 4 include blocks which can be at least one of a hardware device, or a combination of hardware devices and software modules.

The foregoing description of the specific embodiments of the present invention will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein, such that the invention is defined by the appended claims and their equivalents.

The invention claimed is:

1. A method for delivering multimedia content to at least one user equipment (UE) using multimedia broadcast multicast services (MBMS) in a wireless cellular network, the method comprising:
   initiating a MBMS session for delivering the multimedia content cached at a local cache server of at least one wireless cellular network node, by at least one cached content manager;
   defining new control interfaces for communicating between the at least one cached content manager and at least one of: a multi-cell multicast coordination entity (MCE) and a MBMS gateway (MBMS GW);
   sending a notification on a new control interface to the MCE for establishing the MBMS session; and
   signaling at least one radio access network (RAN) node to deliver the multimedia content using the established MBMS session by the MCE.

2. The method of claim 1, further comprising:
   delivering the multimedia contents to the at least one UE by the at least one RAN node using at least one of: a broadcast, a multicast and a unicast mode of transmission,
   wherein the at least one RAN node selects the mode of transmission based on a counting mechanism in the at least one RAN node.

3. The method of claim 1, further comprising:
   signaling the at least one RAN node on an existing control interface by the MCE for delivering the multimedia content.

4. The method of claim 1, wherein the at least one wireless cellular network node is one of: the at least one RAN node, at least one serving gateway (SGW), and at least one packet data network gateway (PGW).

5. The method of claim 1, further comprising:
   initiating the MBMS session by at least one of: the at least one UE, and a broadcast multicast service center (BMSC).

6. The method of claim 1, further comprising:
   caching the multimedia content on the local cache server of the at least one RAN node by at least one of: the BMSC, the at least one wireless cellular network node, and the at least one UE,
   wherein the cached multimedia content is delivered to the at least one UE as scheduled by one of: the BMSC and the at least one cached content manager.

7. The method of claim 6, further comprising:
   securing the cached multimedia content on the local cache server of the at least one RAN node using at least one security key,
   wherein the at least one security key is provided to the at least one RAN node by the BMSC.

8. The method of claim 1, further comprising:
   signaling the MCE, by the at least one UE, to initiate the MBMS session for delivering the multimedia content cached on the at least one UE.

9. A system for delivering multimedia content to at least one user equipment (UE) using multimedia broadcast multicast services (MBMS), the system comprising:
   at least one radio access network (RAN) node;
   at least one cached content manager;
   at least one serving gateway (SGW);
   at least one packet data network gateway (PGW);
   a broadcast multicast service center (BMSC);
   a MBMS gateway (MBMS GW);
   a mobile management entity (MME);
   a multi-cell multicast coordination entity (MCE); and
   at least one content provider,
   wherein the at least one RAN node is configured to define new control interfaces for communicating between the at least one cached content manager and at least one of: the multi-cell MCE and the MBMS GW,
   wherein the at least one cached content manager is configured to initiate a MBMS session for delivering the multimedia content cached at a local cache server of at least one wireless cellular network node
   and send a notification on a new control interface to the MCE for establishing the MBMS session, and
   wherein the MCE is configured to signal the at least one RAN node to deliver the multimedia content using the established MBMS session.

10. A wireless cellular network for delivering multimedia content to at least one user equipment (UE) using multimedia broadcast multicast services (MBMS), the wireless cellular network comprising:
    at least one radio access network (RAN) node;
    at least one cached content manager;
    at least one serving gateway (SGW);
    at least one packet data network gateway (PGW);
    a broadcast multicast service center (BMSC);
    a MBMS gateway (MBMS GW);
    a mobile management entity (MME); and
    a multi-cell multicast coordination entity (MCE),
    wherein the at least one RAN node is configured to define new control interfaces for communicating between the at least one cached content manager and at least one of: the multi-cell MCE and the MBMS GW,
    wherein the at least one cached content manager is configured to initiate a MBMS session for delivering the multimedia content cached at a local cache server of at least one wireless cellular network node
    and send a notification on a new control interface to the MCE for establishing the MBMS session, and
    wherein the MCE is configured to signal at least one RAN node to deliver the multimedia content using the established MBMS session.

11. The wireless cellular network of claim 10, wherein the at least one RAN node is configured to deliver the multimedia content to the at least one UE using at least one of: a broadcast, a multicast, and a unicast mode of transmission, and
    wherein the at least one RAN node selects the mode of transmission based on a counting mechanism in the at least one RAN node.

12. The wireless cellular network of claim 10, wherein the at least one wireless cellular network node is one of: the at least one RAN node, the at least one SGW, and the at least one PGW.

13. The wireless cellular network as in claim 10, wherein the BMSC is configured to initiate the MBMS session.

14. The wireless cellular network of claim 10, wherein at least one of: the BMSC, the at least one wireless cellular network node, and the at least one UE is configured to cache the multimedia content on the local cache server of the at least one RAN node, and
    wherein the cached multimedia content is delivered to the at least one UE as scheduled by one of: the BMSC and the at least one cached content manager.

15. The wireless cellular network of claim 14, wherein the BMSC is further configured to secure the cached multimedia content on the local cache server of the at least one RAN node using at least one security key, and
    wherein the at least one security key is provided to the at least one RAN node.

16. The wireless cellular network of claim 10, wherein the MCE is configured to receive a signal from the at least one UE to initiate the MBMS session for delivering multimedia content cached on the at least one UE.

* * * * *